US007287057B2

(12) United States Patent
Lagarde et al.

(10) Patent No.: US 7,287,057 B2
(45) Date of Patent: Oct. 23, 2007

(54) ACCESSING INFORMATION USING AN INSTANT MESSAGING SYSTEM

(75) Inventors: Konrad C. Lagarde, Milford, CT (US); John Rooney, New Fairfield, CT (US); Eben P. Stewart, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 10/002,685

(22) Filed: Nov. 15, 2001

(65) Prior Publication Data

US 2003/0093480 A1    May 15, 2003

(51) Int. Cl.
  *G06F 15/16* (2006.01)
(52) U.S. Cl. .............. 709/206; 709/204; 709/205; 709/207; 455/414
(58) Field of Classification Search ............. 709/204, 709/205, 206, 249, 207; 455/414
See application file for complete search history.

(56) References Cited

U.S. PATENT DOCUMENTS

| 6,088,796 | A | 7/2000 | Cianfrocca et al. | |
|---|---|---|---|---|
| 6,366,950 | B1* | 4/2002 | Scheussler et al. | 709/206 |
| 6,430,602 | B1 | 8/2002 | Kay et al. | 709/206 |
| 6,549,937 | B1* | 4/2003 | Auerbach et al. | 709/206 |
| 2001/0034782 | A1* | 10/2001 | Kinkade | 709/219 |
| 2002/0055975 | A1* | 5/2002 | Petrovykh | 709/205 |
| 2003/0065776 | A1* | 4/2003 | Malik et al. | 709/225 |
| 2003/0093480 | A1* | 5/2003 | Lagarde et al. | 709/206 |
| 2004/0078424 | A1* | 4/2004 | Yairi et al. | 709/203 |

OTHER PUBLICATIONS

A. Stanford-Clark, IBM Research Disclosure, "Linking instant Messaging to Publish/Subscribe Messaging", Oct. 2000.
The Perl Journal, "Infobots and Purl", Issue #10, vol. 3, No. 2, Summer 1998, 11 pgs.

* cited by examiner

*Primary Examiner*—Saleh Najjar
*Assistant Examiner*—Thuong (Tina) T Nguyen
(74) *Attorney, Agent, or Firm*—John E. Campbell; Jon A. Gibbons; Fleit Kain Gibbons Gutman Bongini & Bianco P.L.

(57) ABSTRACT

A system and method for transmitting messages from a client messaging application to a third party application is shown. The method includes registering with a set of client messaging applications for sending and receiving messages. A message includes an information request. A message is received from the one of the client messaging applications and the destination of the message is determined. The third party application determined to be the destination of the message is then selected and the message is transmitted to the third party application. In the event that the message included an information request, a return message is received from the third party application. The return message includes the requested information. The destination of the return message is determined. The client messaging application determined to be the destination of the return message is selected and the return message is transmitted to the client messaging application.

44 Claims, 11 Drawing Sheets

ACCESSING INFORMATION USING AN INSTANT MESSAGING SYSTEM

CROSS-REFERENCE TO RELATED APPLICATIONS

Not applicable.

BACKGROUND OF THE INVENTION

1. Field of the Invention

The present invention relates to the field of messaging systems and, more specifically, accessing information using messaging systems such as instant messaging systems.

2. Description of Related Art

The growth of the web has revolutionized the way people and computers exchange information. Today, individuals use the web to quickly research and purchase products, engage in personal conversations, find places to eat, plan travel and conduct business. Businesses use the web to advertise and sell their products or services, communicate with their customers, facilitate inter-office communications and even provide services. The primary way in which the web is used to conduct these activities is through the use of a web browser employing the Hyper Text Transfer Protocol (HTTP). Web browsers provide a relatively quick and easy-to-use tool to exchange information. Typically, a person utilizes a web browser adhering to the HTTP to view information transmitted from a web server. In today's fast-paced world, however, sometimes even the speed of a web browser is not fast enough.

Web browsers are many times slow and time-consuming to use. When the connection bandwidth of a web browser is low or there are great amounts of web traffic, there is often a long wait for information to be displayed in the web browser. This is a common problem for low bandwidth users such as PC users with a dial-up connection or handheld/cell phone users with a wireless connection. In addition, web browsers sometimes do not correctly process certain types of web content, such as Java script. This can lead to the web browser shutting down or the computer system crashing. Further, web browsers often require a certain amount of user interaction in order to access information. Users must often navigate through a series of web pages in order to get the information they are seeking. This can be time-consuming and annoying.

For this reason, instant messaging (IM) has gained popularity. IM allows users to instantaneously exchange messages including text, audio, video and various types of files. IM is immediate as it does not require users to navigate through irrelevant information. IM, however, is generally only available for communication between users and does not currently support accessing information in a database or on the web.

Accordingly, what is needed is a system for quickly and efficiently exchanging information on the web.

SUMMARY OF THE INVENTION

Briefly, in accordance with the present invention, disclosed is a system, method and computer program product for transmitting messages from a client messaging application to a third party application. In an embodiment of the present invention, the method includes registering with a set of client messaging applications for sending and receiving messages. In an embodiment of the present invention, a message includes an information request. Subsequently, a message is received from the one of the client messaging applications and the destination of the message is determined. The third party application determined to be the destination of the message is then selected and the message is transmitted to the third party application. In the event that the message included an information request, a return message is received from the third party application. The return message includes the requested information. The destination of the return message is determined. The client messaging application determined to be the destination of the return message is then selected and the return message is transmitted to the client messaging application.

In an embodiment of the present invention, the client messaging application is a commercially available instant messaging application. In another embodiment of the present invention, the third party application is a commercially available messaging server.

The present invention provides the ability to access a database via an instant messaging application. This feature of the present invention allows a user to access desired information quickly, efficiently, and using a minimal amount of user interaction.

In addition, the present invention provides compatibility and portability. The present invention provides an interface with client messaging applications and third party applications. The interface supports various types and formats of client messaging applications and third party applications. This feature increases the ease-of-use and adaptability of the present invention.

The foregoing and other features and advantages of the present invention will be apparent from the following more particular description of the preferred embodiments of the invention, as illustrated in the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENT

Terminology

To more clearly point out and describe the present invention, an effort is made throughout the specification to adhere to the following term definitions as consistently as possible.

The term "web page" refers to a file, typically written in Hypertext Markup Language (HTML), Java, Extended Markup Language (XML), Active Server or Cold Fusion format. Such a file is typically viewed using a web browser.

The term "web site" refers to a group of web pages that are associated in some manner, such as geographically, contextually or categorically. A web site usually refers to a group of web pages located within one domain name.

The term "user" refers to a person using an application executing on a computer system. In the present invention, the user is a person using a client messaging application.

The term "API" refers to an Application Programming Interface. An API is an interface by which an application program can access operating system commands. An API offers a level of abstraction between a high level application program and a lower level application program that was written without consideration for the calling conventions supported by the high level application program.

The term "telnet" refers to the internet standard protocol for remote login. Telnet is a message-based protocol whereby a terminal emulator is provided to a remote user for a remote login session on a computer system. The remote user conducts the session on the computer system as if the remote user were present at the computer system.

The term "Lightweight Directory Access Protocol (LDAP)" refers to a standard protocol for accessing directory services. LDAP is a message based protocol whereby a user can utilize directory services and access directory information using a set of commands.

The term "bot" refers to an autonomous computer program that acts as an agent for a user or another computer program. In the present invention, a bot is used to access a database for a user.

The term "instant message (IM)" refers to a message that is typically sent and received using an instant messaging application such as American Online Instant Messenger. Instant messages are typically received and displayed in an interface immediately after transmission. Instant messaging applications are used for immediate communication between users.

Overview of the System

The present invention is described in terms of the examples below. This is for convenience only and is not intended to limit the application of the present invention. In fact, after reading the following description, it will be apparent to one skilled in the relevant art(s) how to implement the following invention in alternative embodiments.

Figure 1:
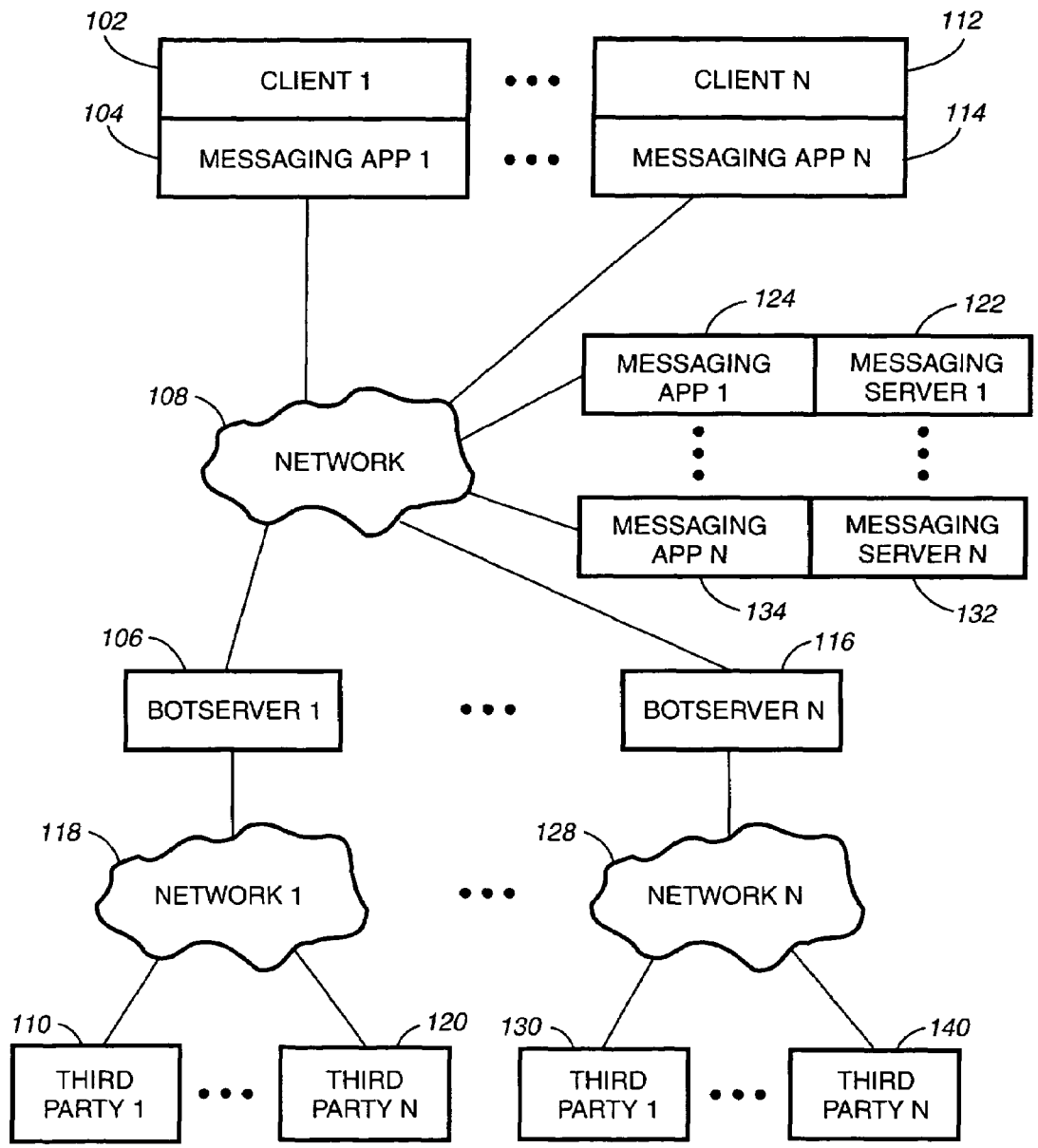
FIG. 1 is a block diagram illustrating the overall system architecture of an embodiment of the present invention, showing connectivity among the various components.

FIG. 1 is a block diagram illustrating the overall system 100 of an embodiment of the present invention, showing connectivity among the various components. FIG. 1 is a generalized embodiment of the present invention. FIG. 1 shows clients running messaging applications connecting to Botservers via a network. The Botservers in turn connect to third parties via a network. FIG. 1 represents the network model of the present invention.

System 100 supports multiple clients, with each client running a client messaging application. FIG. 1 shows multiple clients numbered one 102 through N 112. Corresponding to each client is a messaging application numbered one 104 through N 114. In one embodiment of the present invention, messaging applications 104 through 114 are any commercially available instant messaging application programs executing on client 102 through 112. Examples of such instant messaging applications are: Lotus Sametime Messaging, America Online Instant Messenger, MSN Messenger Service, Yahoo Messenger, ICQ and Jabber Instant Messenger. In another embodiment of the present invention, messaging applications 104 through 114 are a telnet utility. Messaging applications 104 through 114 are implemented in hardware, software, or a combination of the two.

System 100 also supports multiple messaging servers, with each messaging server running a messaging application. FIG. 1 shows multiple messaging servers numbered one 122 through N 132. In one embodiment of the present invention, messaging servers 122 through 132 are any commercially available messaging servers for handling messaging operations. Examples of such messaging servers are the Lotus Domino Server and the Microsoft Exchange Server. Corresponding to each messaging server 122 through 132 are multiple messaging applications numbered one 124 through N 134. Messaging applications 124 through 134 are components of messaging applications 104 through 114. That is, multiple messaging applications numbered one 124 through N 134 provide functionality or support for messaging applications 104 through 114. In an embodiment of the present invention, messaging applications 104 through 114 are fully self-sustainable and messaging applications numbered one 124 through N 134 are not required in system 100.

System 100 shows network 108 for connecting clients 102 through 112, messaging servers 122 through 132 and Botservers 106 through 116. In one embodiment of the present invention, network 108 is a circuit switched network, such as the Public Service Telephone Network (PSTN). In another embodiment of the present invention, the network 108 is a packet switched network. The packet switched network is a wide area network (WAN), such as the global Internet, a private WAN, a local area network (LAN), a telecommunications network or any combination of the above-mentioned networks. In another embodiment of the present invention, network 108 is a wired, wireless, broadcast or point-to-point.

System 100 supports multiple Botservers numbered one 106 through N 116. Botservers 106 through 116 are computer application programs which embody the substantive concepts of the present invention. Botservers 106 through 116 comprise the functionality of messaging server operations, message routing, message queuing and bot operations. Botserver 106 is implemented in hardware, software, or a combination of the two. Each component of Botservers 106 through 116 is described in greater detail below.

In an embodiment of the present invention, Botservers 106 through 116 execute on the same computer systems as the computer system of clients 102 through 112. Alternatively, Botservers 106 through 116 execute on computer systems separate from the computer systems of clients 102 through 112. In another embodiment of the present invention, Botservers 106 through 116 exist on the same network as users 102 through 112 and messaging applications 104 through 114. In this case, Botserver 106 communicates with users 102 through 112 and messaging applications 104 through 114 over the network. Various networks are described in greater detail below.

In an embodiment of the present invention, the computer systems of clients 102 through 112 and Botservers 106 through 116 are one or more PCs (e.g., IBM or compatible PC workstations running the Microsoft Windows 95/98/ME or Windows NT/2000 operating system, Macintosh computers running the Mac OS operating system, or equivalent), Personal Digital Assistants (PDAs), game consoles or any other processing devices that are used with a messaging system. In another embodiment of the present invention, the computer systems of clients 102 through 112 and Botservers 106 through 116 are a server such as one or more SUN Ultra workstations running the SunOS operating system. In yet another embodiment of the present invention, the computer systems of clients 102 through 112 and Botservers 106 through 116 are one or more IBM or compatible PC workstations with Intel Pentium III processors running either the Windows NT operating system or the BSD Unix operating system.

Each of the Botservers 106 through 116 are connected to a separate network. Multiple networks numbered one 118 through N 128 are shown. Each of network 118 through 128 is a separate network or the same network. A more detailed description of various networks is given above.

System 100 supports multiple third party applications. FIG. 1 shows multiple third party applications for each of a multitude of networks: third party applications numbered one 110 through N 120 are shown and third party applications numbered one 130 through N 140 are shown. Third party applications 110 through 120 and 130 through 140 are any database system supporting the storage and retrieval of records. In an embodiment of the present invention, third party applications 110 through 120 and 130 through 140 are commercially available database systems such as personal finance databases, stock market databases or personal contact databases. In another embodiment of the present invention, third party applications 110 through 120 and 130 through 140 are locations for storing and retrieving files such as a web site, a File Transfer Protocol (FTP) site or a gopher site.

The Botserver

Figure 2A:
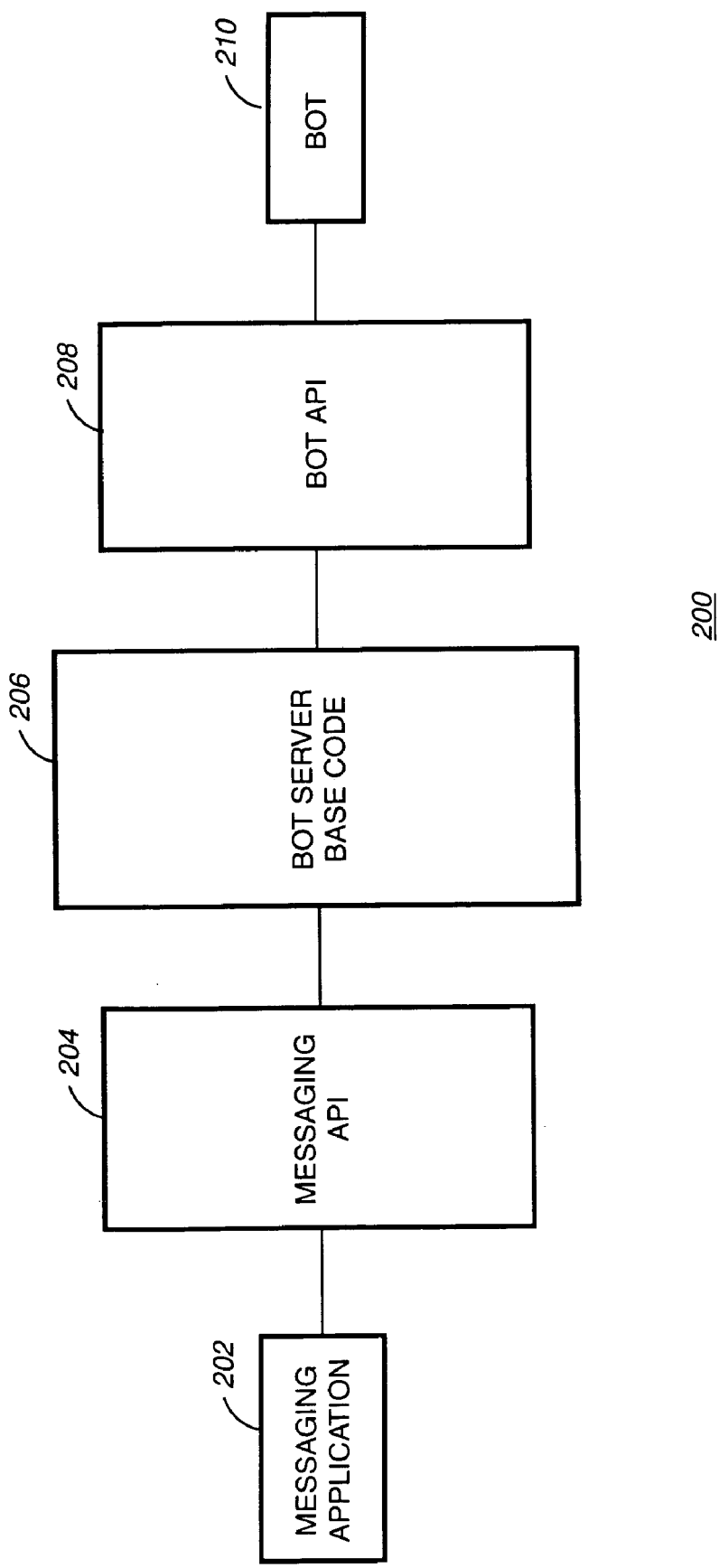
FIG. 2A is a block diagram showing a more detailed illustration of the Botserver in an embodiment of the present invention, showing connectivity among the various components.

FIG. 2A is a block diagram 200 showing a more detailed illustration of each Botserver 106 through 116 (see FIG. 1) in an embodiment of the present invention, showing connectivity among the various components. As explained above, diagram 200 comprises the functionality of messaging server operations, message routing, message queuing and bot operations. FIG. 2A shows a messaging application 202, a messaging API 204, Botserver base code 206, bot API 208 and bot 210.

Messaging application 202 serves to handle the messages received from clients. Messaging application 202 is a component of messaging applications 104 through 114 shown in FIG. 1. That is, messaging application 202 provides functionality or support for messaging applications 104 through 114. In an embodiment of the present invention, messaging applications 104 through 114 are fully self-sustainable and messaging application 202 is not required in diagram 200.

Botserver base code 206 comprises the substantive functions performed by each Botserver 106 through 116. Botserver base code 206 performs, among other things, message routing and message queuing. Botserver base code 206 also responds to certain messages from user 102. The functions performed by Botserver base code 206 are described in greater detail below.

Bot 210 is an autonomous computer program that acts as an agent for user 102. Bot 210 is an application program capable of communicating with third party applications 110 through 120 and 130 through 140. Bot 210 communicates with third party applications 110 through 120 and 130 through 140 in response to a message from a client. Specifically, bot 210 executes an information request embedded within a message received from a client. Information requests within a message are in text format, audio format or any other query format known to one of ordinary skill in the art.

In one example of the operation of a bot, a bot 210 is programmed to retrieve telephone numbers from a telephone number database 110. Bot 210 receives from a client 102 an instant text message including the text request: "Phone number: John Doe." Bot 210 recognizes the text of the instant message as a request for a telephone number. The text of the instant message is then translated into a query that is handled by a third party application 110, which is a telephone number database. Using this query, bot 210 then retrieves the telephone number from third party application 110. Subsequently, bot 210 formats and sends to client 102 a reply instant text message including the telephone number requested. In an embodiment of the present invention, bot 210 is programmed to handle a text query in Structured Query Language (SQL) format. In another embodiment of the present invention, bot 210 is programmed to handle any query known to one of ordinary skill in the art for accessing a database. A more detailed example of a bot is given below.

Messaging API 204 is an API that provides a level of abstraction between Botserver base code 206 and messaging application 202. That is, messaging API 204 acts as a translator between Botserver base code 206 and messaging application 202. The calling conventions utilized by Botserver base code 206 to communicate with messaging application 202 must adhere to the calling conventions of messaging API 204. Likewise, the calling conventions of messaging API 204 must adhere to the calling conventions of messaging application 202. As a result, there is no need for Botserver base code 206 to adhere to the calling conventions used by messaging application 202. Conversely, there is no need for messaging application 202 to adhere to the calling conventions of Botserver base code 206. This is advantageous as it allows Botserver base code 206 and messaging application 202 to be independent of each other. Thus, the use of messaging API 204 increases the compatibility and portability of both Botserver base code 206 and messaging application 202.

Bot API 208 is an API that provides a level of abstraction between Botserver base code 206 and bot 210. That is, bot API 208 acts as a translator between Botserver base code 206 and bot 210. The calling conventions utilized by Botserver base code 206 to communicate with bot 210 must adhere to the calling conventions of bot API 208. Likewise, the calling conventions of bot API 208 must adhere to the calling conventions of bot 210. As a result, there is no need for Botserver base code 206 to adhere to the calling conventions used by bot 210. Conversely, there is no need for bot 210 to adhere to the calling conventions of Botserver base code 206. This is advantageous as it allows Botserver base code 206 and bot 210 to be independent of each other.

Thus, the use of bot API 208 increases the compatibility and portability of both Botserver base code 206 and bot 210.

In one embodiment of the present invention, a Java code implementation of messaging API 204 and bot API 208 is described in Appendix A of the present application. Appendix A is hereby incorporated by reference in its entirety. Appendix A provides a summary and a hierarchy for each class and each interface of the messaging API 204 and the bot API 208 Java code implementation. Appendix A also provides a description of each class and a master index including every class, interface, method and variable in the Java code implementation.

Figure 2B:
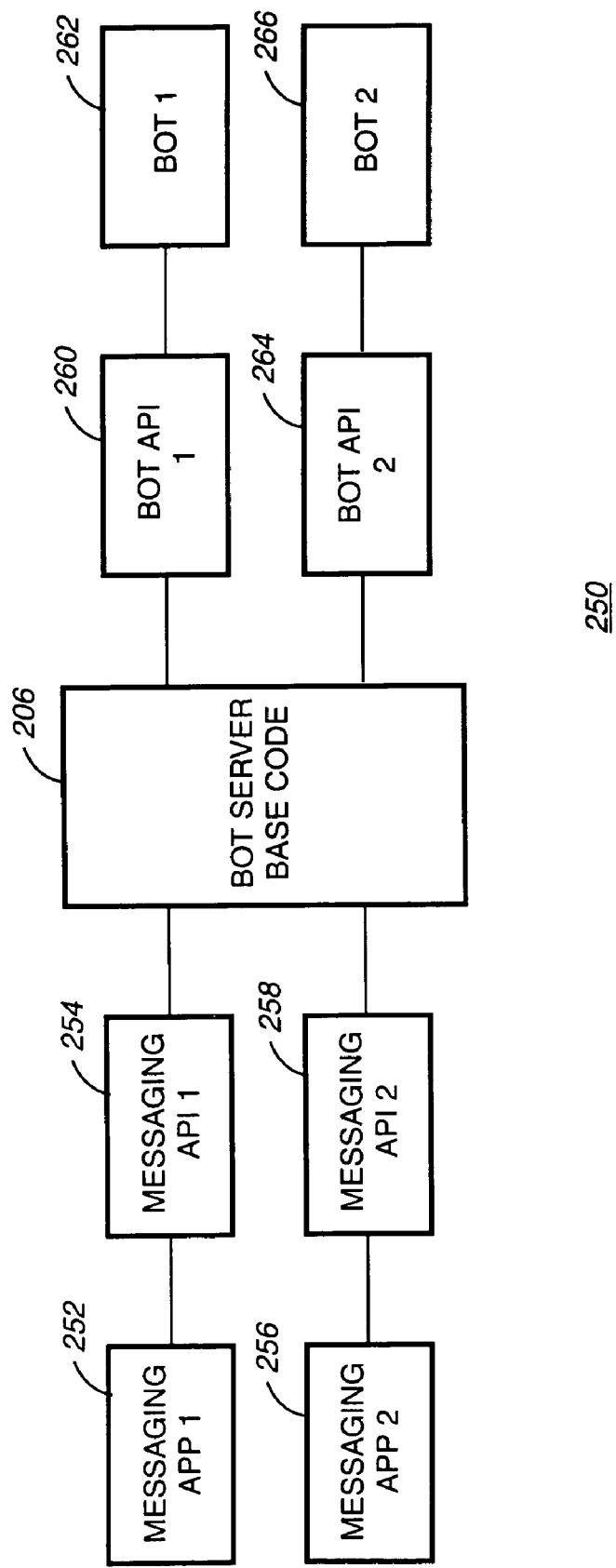
FIG. 2B is a block diagram showing a more detailed illustration of the Botserver in an embodiment of the present invention, showing connectivity among the various components.

FIG. 2B is a block diagram 250 showing a more detailed illustration of each Botserver 106 through 116 in an embodiment of the present invention, showing connectivity among the various components. FIG. 2B shows the extendability of Botserver 106. FIG. 2B shows messaging applications 252 and 256, messaging APIs 254 and 258, Botserver base code 206, bot APIs 260 and 264 and bots 262 and 266. FIG. 2B shows that Botserver 106 supports multiple messaging applications, multiple messaging APIs, multiple bot APIs and multiple bots.

One example of the operation of a Botserver as shown in FIG. 2B is a Botserver 106 implemented in an office setting. The clients in this example, office workers, utilize various instant messaging applications and desire to access more than one database using these instant messaging applications. In this example, the clients desire to use both the Yahoo Messenger instant messaging application and the ICQ instant messaging application. Thus, messaging application 252 is programmed to handle Yahoo Messenger instant messages and messaging application 256 is programmed to handle ICQ instant messages. As a result, messaging API 254 acts to interface messaging application 252 with Botserver base code 206 and messaging API 258 acts to interface messaging application 256 with Botserver base code 206. Because of the use of the messaging APIs 254 and 258, Botserver base code 206 need not be concerned with the individual implementations of the messaging applications 252 and 256.

In this example, the clients desire to access two third party applications: a telephone number database and a stock-quote database. Both databases in this example exist on the same network as the clients. A bot 262 has been created to handle information requests for telephone numbers and a bot 266 has been created to handle information requests for stock-quotes. Bot API 260 acts to interface bot 262 with Botserver base code 206 and bot API 264 acts to interface bot 266 with Botserver base code 206. Because of the use of the bot APIs 260 and 264, Botserver base code 206 need not be concerned with the individual implementations of the bots 262 and 266.

In this example, a client uses Yahoo Messenger to send an instant message requesting a particular telephone number. Messaging application 252 receives the message and sends it to Botserver base code 206 via messaging API 254. Botserver base code 206 recognizes the message as a Yahoo Messenger instant message and places the message in the incoming message queue corresponding to Yahoo Messenger. Subsequently, the message is identified as a request for a telephone number and the message is sent to the appropriate bot (bot 262) via bot API 260.

Bot 262 receives the instant message, reads the information request and accesses the requested information from the telephone number database. Bot 262 then formats and sends to the client a reply instant message including the requested information. Botserver base code 206 receives the reply message via bot API 206. Botserver base code 206 recognizes the reply message as a Yahoo Messenger instant message and places the reply message in the outgoing message queue corresponding to Yahoo Messenger. Subsequently, the reply message is sent to the appropriate messaging application (messaging application 252) via messaging API 254. The reply message is then sent to the intended client.

Operation of the System

Figure 3:
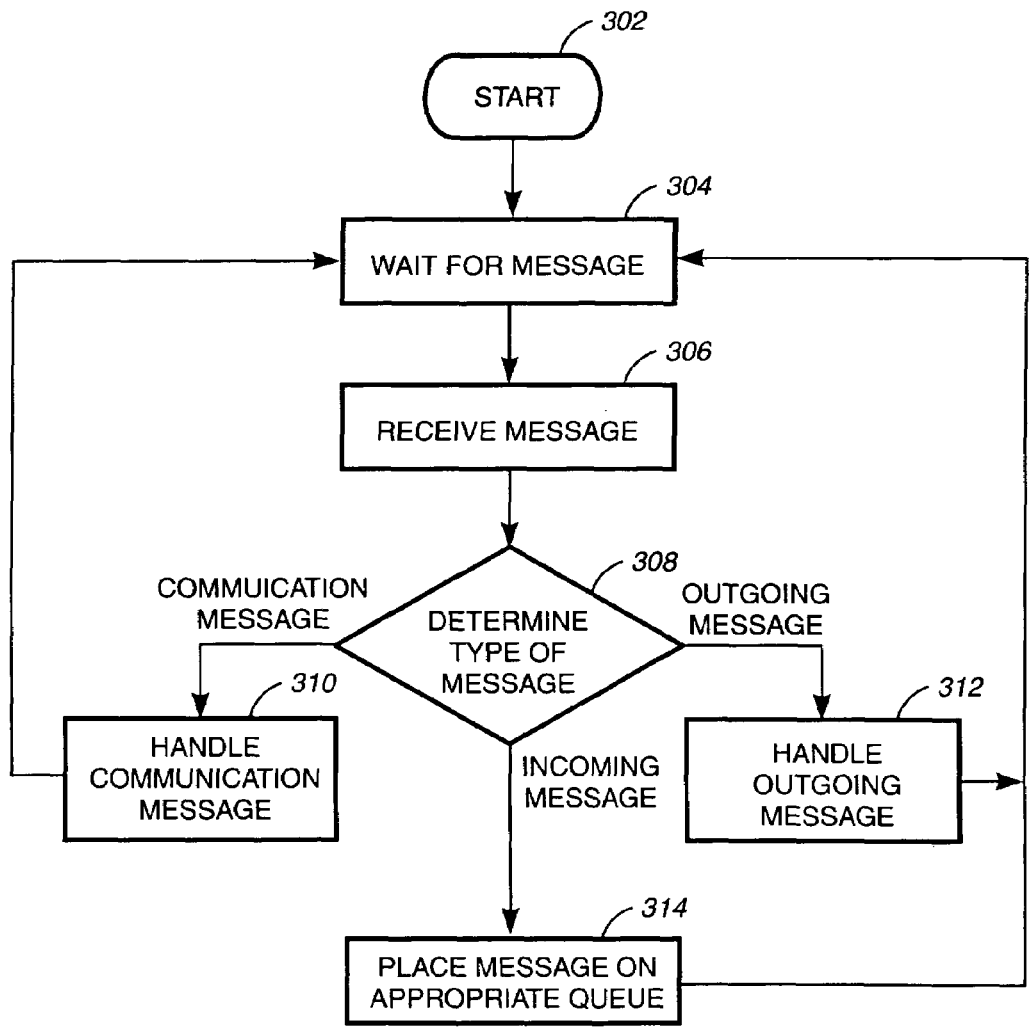
FIG. 3 is a flowchart depicting an embodiment of the operation and control flow of the message pre-processing procedure of the present invention.

FIG. 3 is a flowchart depicting an embodiment of the operation and control flow 300 of the message pre-processing procedure of the present invention. FIG. 3 generally shows the message pre-processing operations conducted by each Botserver 106 through 116 and specifically by Botserver base code 206. Control flow 300 begins with step 302 and flows directly to step 304.

In step 304, the Botserver waits for a request to handle a message. This request originates from a client, a messaging application or a bot.

In step 306, a request to handle a message is received.

In step 308, the Botserver determines the type of the message. If the message was sent by a client and intended for a bot, the message is deemed an incoming message and control flows directly to step 314. If the message was sent by a bot and intended for a client, the message is deemed an outgoing message and control flows directly to step 312. If the message is a communication message from a messaging application, the message is deemed a communication message and control flows directly to step 310.

In step 310, the communication message is handled. A communication message is a message from a messaging application that can be handled by the Botserver. An example of a communication message is a status request message from a messaging application. A status request message seeks a status, such as connection status, of the Botserver. In this example, the Botserver, in response to the status request message, checks its status and returns the information to the requesting messaging application without interacting with any other entity. Another example of a communication message is a fatal error message from a messaging application. A fatal error message seeks to inform the Botserver that an error has occurred at a messaging application during processing. In this example, the Botserver, in response to the fatal error message, creates an error log without interacting with any other entity.

In step 312, the Botserver handles the outgoing message. An outgoing message is typically a message originating from a bot and intended for a client. In this case, the Botserver routes the message to the intended client. In an embodiment of the present invention, the Botserver also queues the message in a queue that flows towards the intended client. In an embodiment of the present invention, each queue uses any conventional queuing technique known to one of ordinary skill in the art. Queuing techniques are described in greater detail below.

In step 314, Botserver 106 handles the incoming message. In doing so, Botserver 106 determines the messaging application source of the message and places the incoming message on the appropriate queue. As shown in FIG. 2B, Botserver 106 supports multiple messaging applications 252 and 256, multiple messaging APIs 254 and 258, multiple bot APIs 260 and 264 and multiple bots 262 and 266. In an embodiment of the present invention, a separate queue corresponding to each messaging application 252 and 256 is created. As such, each queue holds the messages corresponding to the messaging application from which the incoming message originated.

In an embodiment of the present invention, the Botserver reviews each incoming message. The Botserver then accesses a messaging application registry to determine the source of the incoming message. The messaging application registry consists of a list of messaging applications currently being supported by the Botserver. The Botserver reviews each incoming message and attempts to match the message to a messaging application on the list in the messaging application registry. Once the source of the message is known, the Botserver recognizes the queue in which the message belongs. The Botserver places each incoming message in the queue which corresponds to the messaging application from which it was received. In an embodiment of the present invention, each queue uses any conventional queuing technique known to one of ordinary skill in the art. Queuing techniques are described in greater detail below.

Control flow 300 executes continuously between steps 304 to 314 as messages are received and processed.

Figure 4:
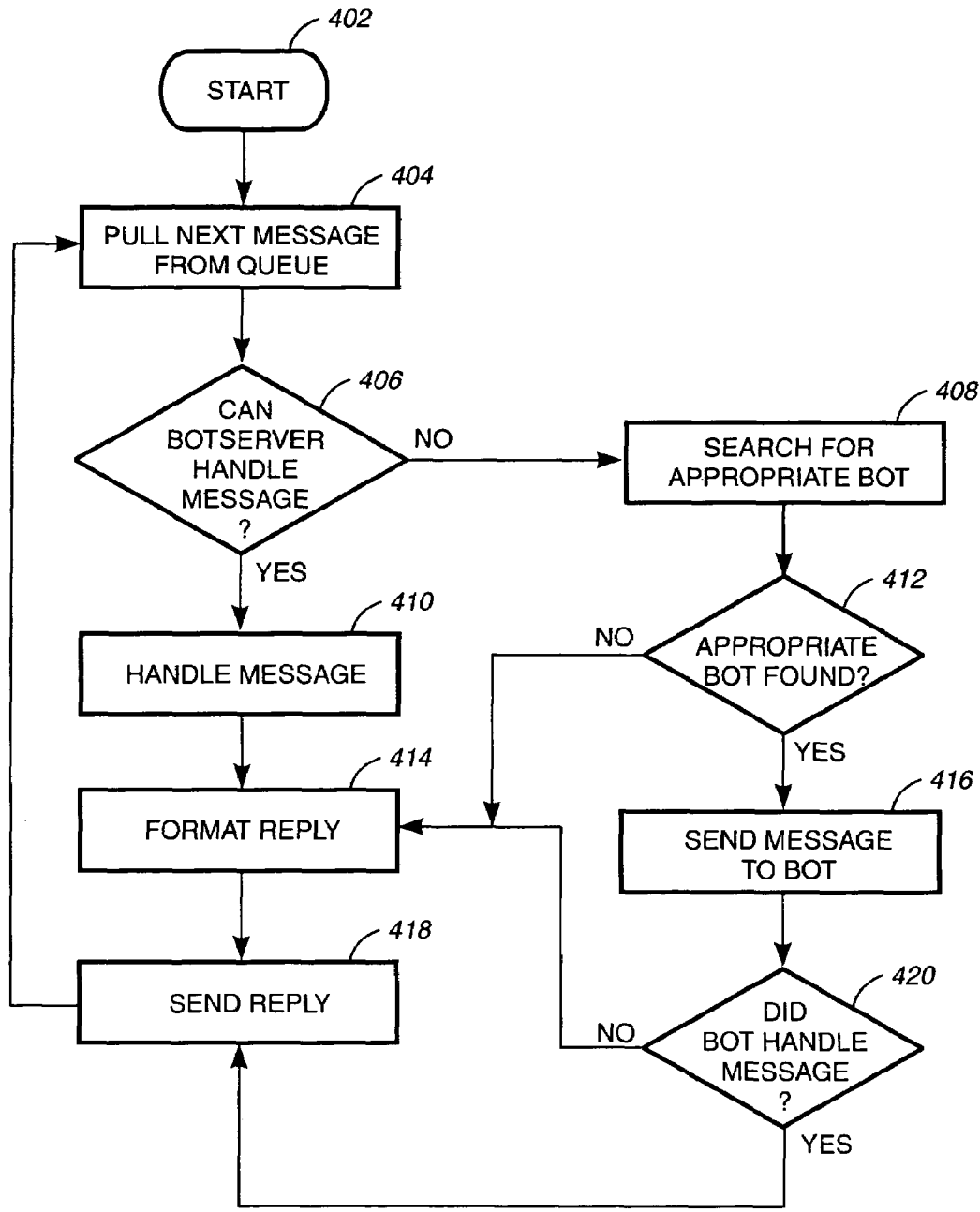
FIG. 4 is a flowchart depicting an embodiment of the operation and control flow of the message handling process of the present invention, after the message pre-processing procedure of FIG. 3.

FIG. 4 is a flowchart depicting an embodiment of the operation and control flow 400 of the message handling process of the present invention, after the message pre-processing procedure of FIG. 3. FIG. 4 generally shows the message handling operations conducted by the Botserver and specifically by Botserver base code 206. Control flow 400 is a flowchart of operation and control after the message pre-processing of control flow 300. Control flow 400 begins with step 402 and flows directly to step 404.

In step 404, the Botserver accesses the next message available on the incoming message queue for processing. As explained above, various queuing techniques are used to queue messages. The first-in-first-out queuing technique, for example, queues messages in the order in which they are received. As such, the first message to be received is the first message to be processed and transmitted. In another example, the priority queuing technique queues messages in the order of their priority. As such, the messages with the highest priorities are processed and transmitted before other messages. Any conventional queuing technique known to one of ordinary skill in the art is used by Botserver 106 to queue messages.

In step 406, the Botserver determines whether it handles the message itself. If the result of this determination is affirmative, control flows directly to step 410. If the result of this determination is negative, control flows directly to step 408.

In step 410, the Botserver handles the message. Various messages are handled solely by the Botserver. One example of such a message is a help message from a client. In this example, the Botserver, in response to the help message, provides the client with a list of bots or bot commands available to the client without interacting with any other entity, such as third party applications 110 through 140 (see FIG. 1).

In step 414, the Botserver formats a reply to the message. In the help message example, the Botserver formats a reply message to the client including a list of bots or bot commands available to the client. In the event that control flowed to step 414 from step 412, the Botserver 106 formats a reply message indicating that an appropriate bot was not found. In this case, the message also provides a list of bots currently supported by the Botserver. In the event that control flowed to step 414 from step 420, the Botserver formats a reply message indicating that although an appropriate bot was found, the bot did not handle the message correctly. In this case, the message also provides a list of commands or messages currently supported by the appropriate bot.

In step 418, the Botserver sends the reply message formatted in step 414 to the intended recipient.

In step 408, the Botserver searches for the appropriate bot to handle the incoming message. In an embodiment of the present invention, the Botserver accesses a bot registry to determine the bot to which the incoming message corresponds. The bot registry consists of a list of bots currently being supported by the Botserver. The Botserver reviews each incoming message and attempts to match the message to a bot on the list in the bot registry.

In step 412, the Botserver determines whether an appropriate bot was found in step 408. If the result of this determination is positive, control flows directly to step 416. If the result of this determination is negative, control flows directly to step 414.

In step 416, the incoming message is sent to the appropriate bot found in step 408.

In step 420, the Botserver determines whether the bot to which the incoming message was sent handled the message appropriately. If the result of this determination is positive, control flows directly to step 418. If the result of this determination is negative, control flows directly to step 414.

In step 418, the formatted message is sent. In the event that control flowed to step 418 from step 414, the Botserver sends the message formatted by the Botserver in step 414. In the event that control flowed to step 418 from step 420, the Botserver sends the message formatted by the bot found in step 412.

Control flow 400 executes continuously between steps 404 to 420 as messages are received and processed.

Example Bot

In an embodiment of the present invention, a Help Bot is programmed for accessing information currently in a web site format. In this embodiment, the Help Bot is programmed to interact with the client using natural language. The Help Bot reads the information requests of the client and searches the web site for the requested information.

In an example, the client desires to access information regarding his computer system. The organization for which the client works has set up an Information Technology (IT) web site for accessing information regarding the IT system of the organization. The client has access to an instant messaging application that interfaces with the Help Bot which is specifically programmed to access the IT web site. The Help Bot has been programmed to parse natural language text questions from a client. The parsed text is then used to do a keyword search on the IT web site. The resulting matches are then presented to the client.

Following is an example of an exchange that occurs between a client and the example Help Bot described above. The client has lost the password to his email application. The client opens his instant messaging application and chooses the Help Bot with which to communicate. The client reads in the instant messaging application window:

HelpBot>Welcome. Please enter your question.

The client enters into the instant messaging application window:

Client>How do I reset the password for my email application?

The Help Bot parses the text question of the client and extracts the key words in the client's question: reset, password, and email application. The Help Bot then does a keyword search of the key words in the IT web site. The Help Bot presents the resulting matches to the client:

HelpBot>Enter the number of the selection below and press enter:
1 How do I set up a screensaver password?
2 How do I change my password for my internet application?
3 How do I reset the password for my email application?

The client then presses 3 and the Help Bot responds with the pertinent information.

Client>3
HelpBot>Open your email application.
   Select Tools.
   Select Options.
   Select the Passwords tab.
   Press the Reset Button.

Alternatively, if the information that the client is requesting is too lengthy, the Help Bot provides a URL to the client instead of displaying the requested information. The URL will link the client to a web page that will provide the requested information to the client.

Client>3
HelpBot>The following web page will help you: http://server/email/passwords In an embodiment of the present invention, the functions of the Help Bot are supplemented in several ways. If the information requested by the client is not found, The Help Bot automatically contacts an administrator. In addition, the Help Bot automatically sends the client's question to a bulletin board system or other message system for online communities. In order to enhance the didactic capabilities of the Help Bot, text is supplemented by audio, video or other forms of communication.

Example Interface

In an embodiment of the present invention, a Lotus SameTime Connect Instant Messaging application is used as a client messaging application together with a bot for accessing a third party application—an LDAP directory. In this embodiment, the LDAP directory is the internal IBM employee directory service known as the Bluepages directory. The bot in this embodiment is known as the Bluepages bot and is capable of reading an information request for a client, finding the Bluepages directory for the requested information and providing the requested information to the client.

Figure 5:
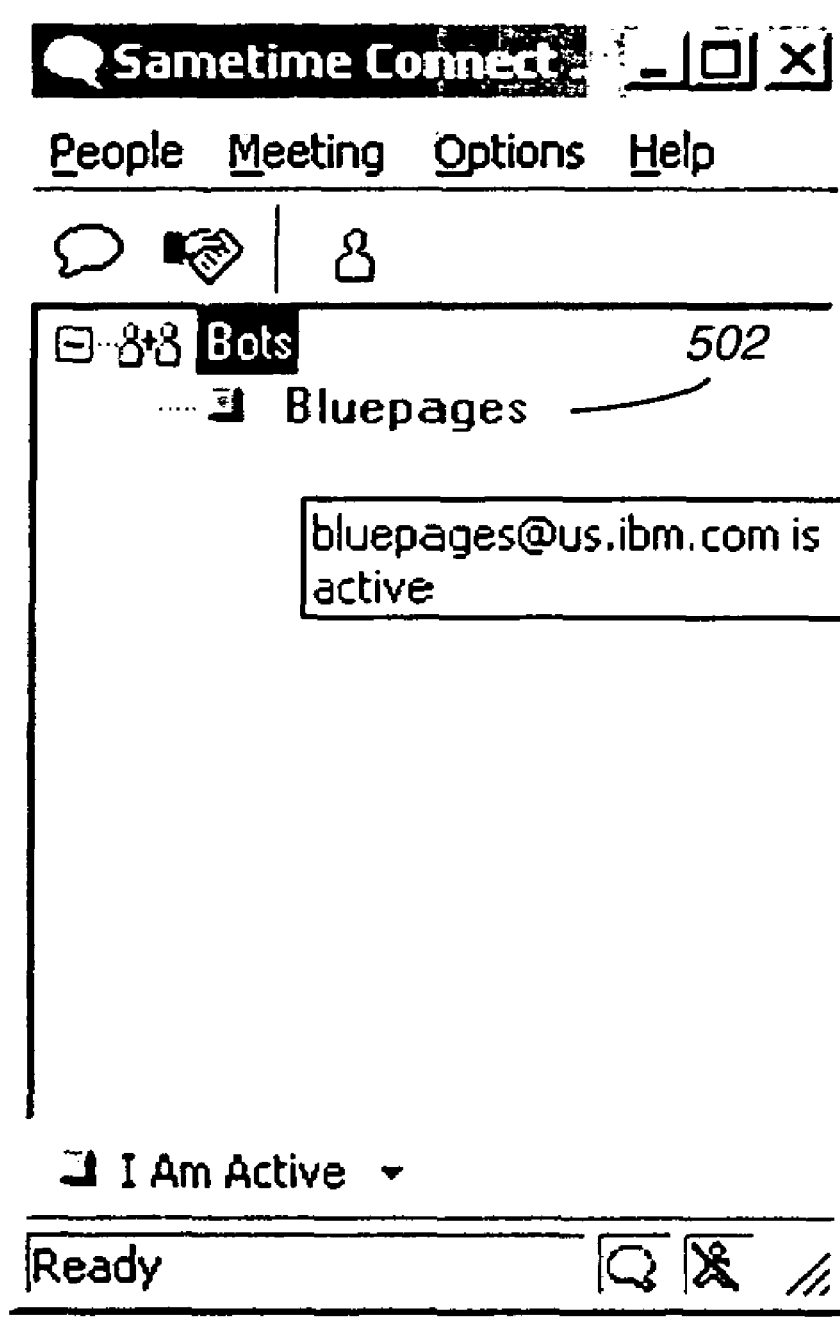
FIG. 5 is a screenshot showing an instant messaging interface to a bot, in one embodiment of the present invention.

FIGS. 5-9 are screenshots showing the Lotus SameTime Connect Instant Messaging application interfacing to a Bluepages bot, in one embodiment of the present invention. FIG. 5 shows the Lotus SameTime Connect Instant Messaging application as it is first opened. The window shows a selection of choices for the client. The choices are entities with which the client communicates. The Bluepages bot 502 is shown as a choice 502. Other choices, such as friends of the user, are also typically shown.

Figure 6:
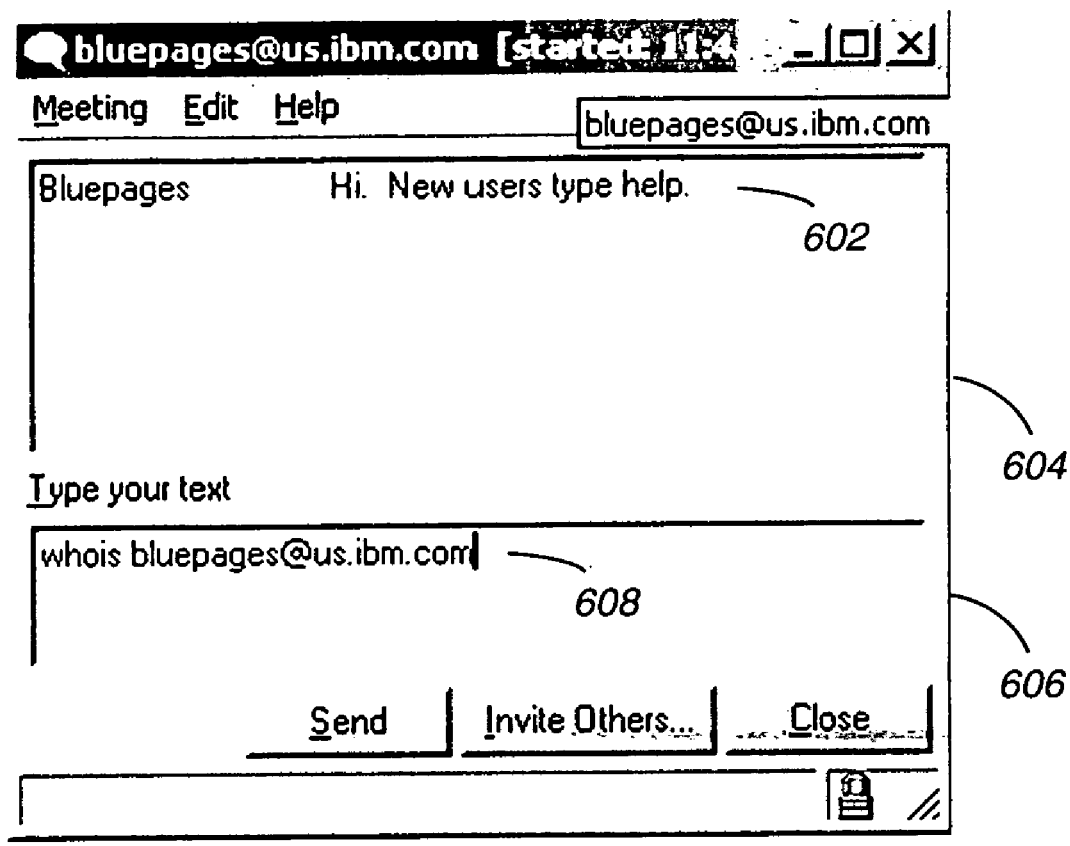
FIG. 6 is a screenshot showing an instant messaging interface to a bot, in one embodiment of the present invention.

FIG. 6 shows the SameTime Connect Instant Messaging application after the Bluepages bot has been chosen for communication by the client. Upon selection of the Bluepages bot, a standard greeting 602 from the Bluepages bot is displayed in the communications window. As shown, the top of the communications window 604 displays information received from the Bluepages bot while the bottom of the communications window 606 displays information being sent by the client to the Bluepages bot. The client proceeds to submit a request for information via the bottom of the communications window. The client types the entry 608 "whois bluepages@us.ibm.com." The format of this request indicates that the client seeks information regarding the following entity: bluepages@us.ibm.com. This entity is the Bluepages bot. The Bluepages bot then proceeds to find information regarding itself in the Bluepages directory.

Figure 7:
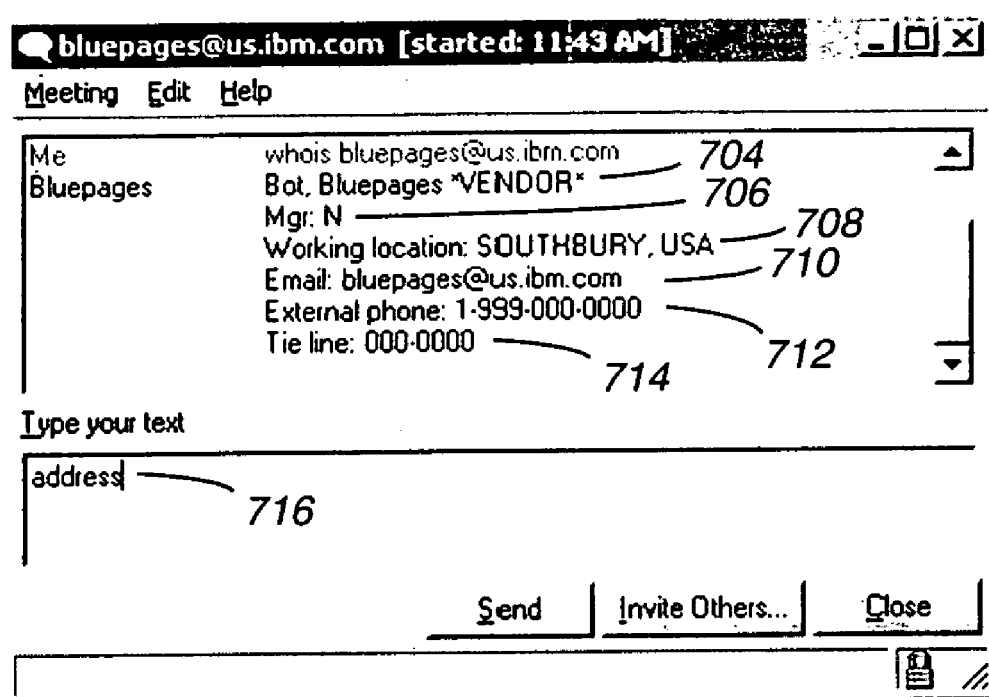
FIG. 7 is a screenshot showing an instant messaging interface to a bot, in one embodiment of the present invention.

FIG. 7 shows the response from the Bluepages bot of FIG. 6. It is shown that the Bluepages bot has retrieved a variety of information from the Bluepages directory regarding itself. The Bluepages bot has retrieved from the Bluepages directory the name 704, manager 706, location 708, email address 710, telephone number 712 and tie line 714 of the entity sought by the client. The client proceeds to seek the physical address of the Bluepages bot by typing in "address" 716 via the bottom of the communications window 606. The Bluepages bot then proceeds to find the address information pertaining to itself in the Bluepages directory.

Figure 8:
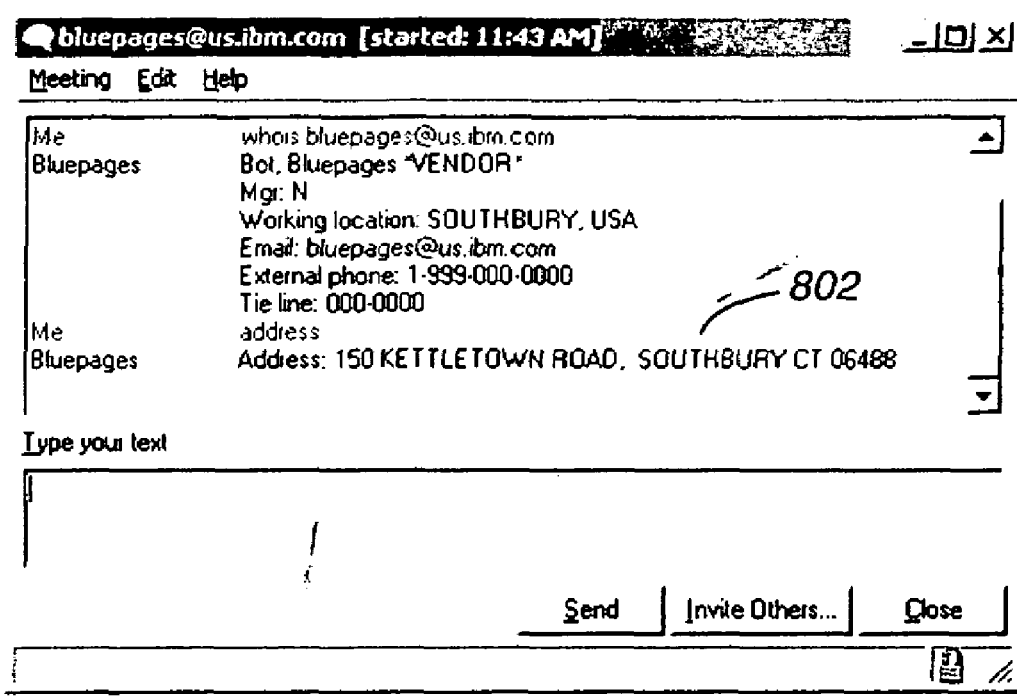
FIG. 8 is a screenshot showing an instant messaging interface to a bot, in one embodiment of the present invention.
Figure 9:
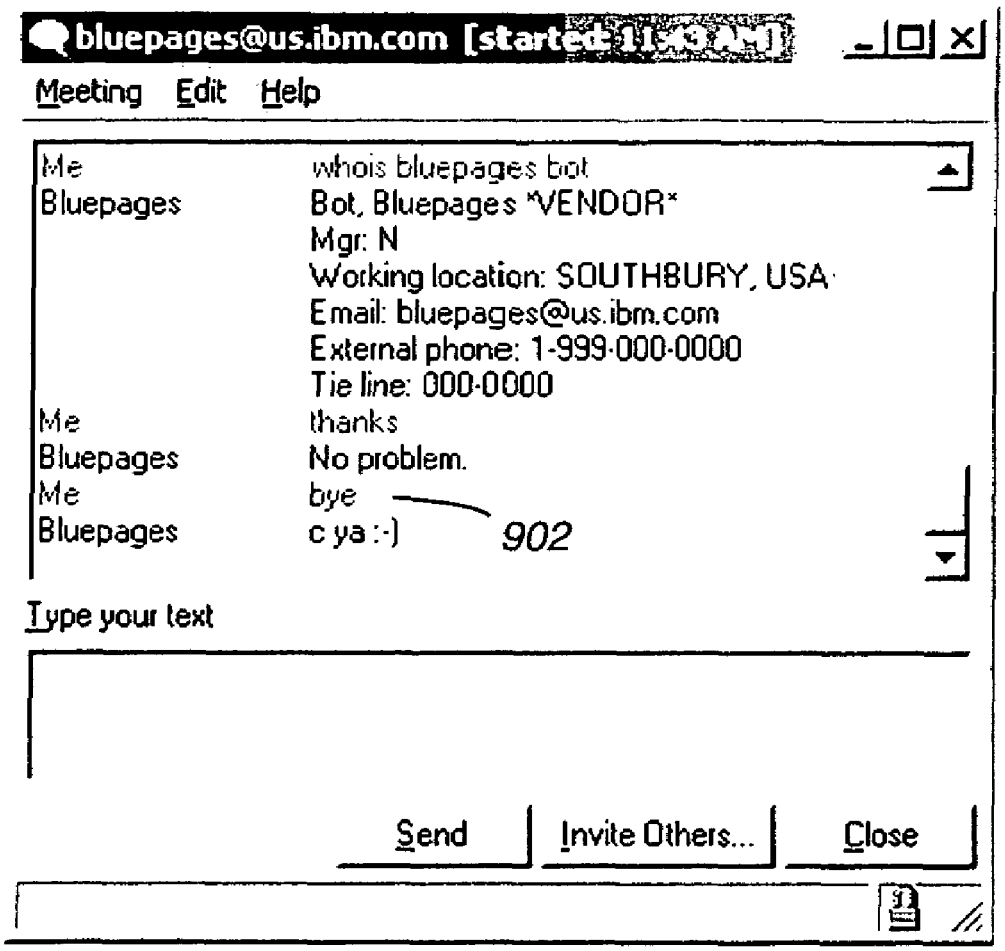
FIG. 9 is a screenshot showing an instant messaging interface to a bot, in one embodiment of the present invention.

FIG. 8 shows the response from the Bluepages bot to the query of FIG. 7. It is shown that the Bluepages bot has retrieved the address information 802 of itself from the Bluepages directory. FIG. 9 shows the closing of communication between the client and the Bluepages bot. The client types in a greeting followed by a final salutation 902. The Bluepages bot responds and communication between the two ceases.

Example Implementations

Figure 10:
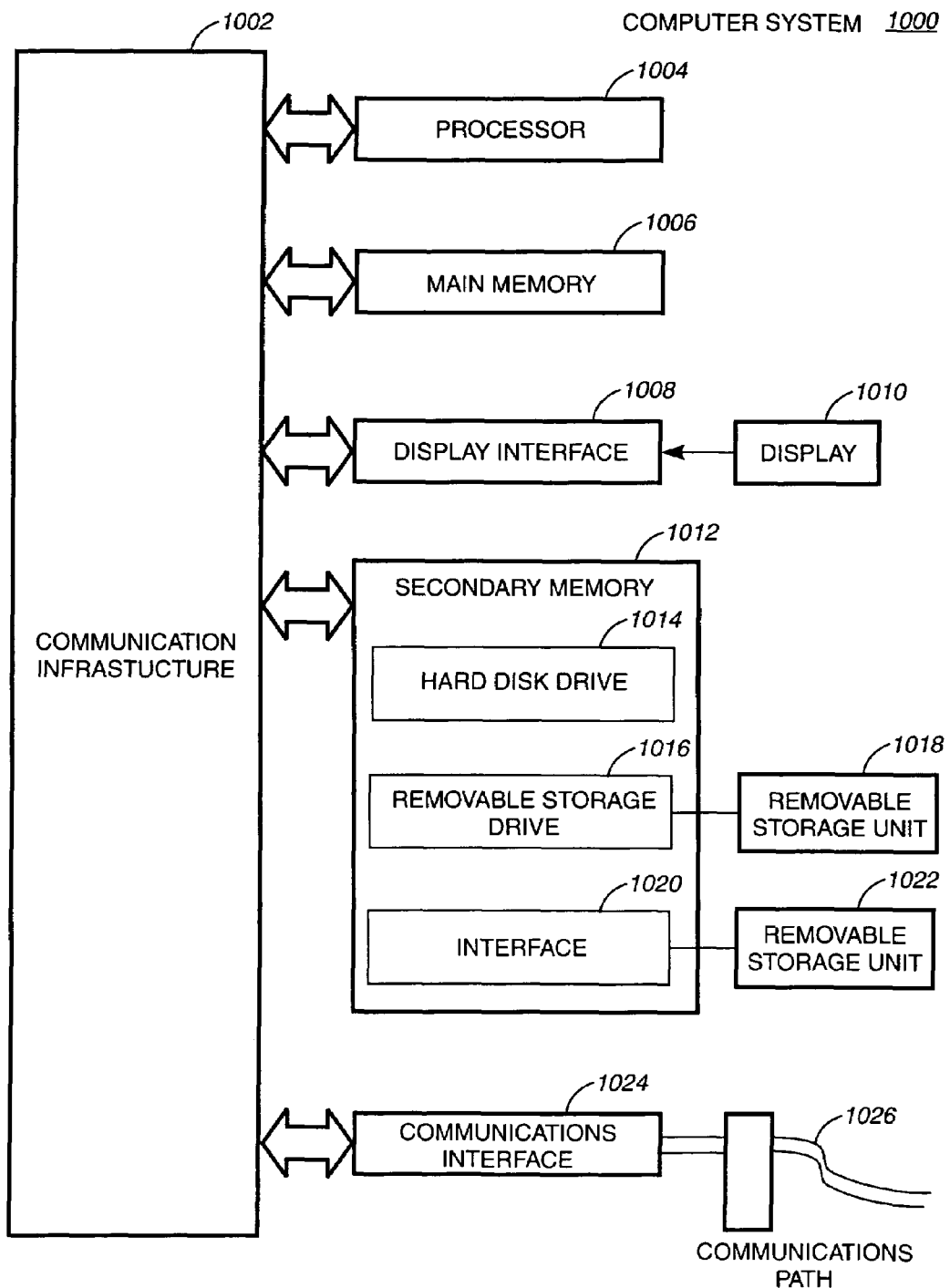
FIG. 10 is a block diagram of an exemplary computer system useful for implementing the present invention.

The present invention (i.e., systems 100, 200, 250, flows 300, 400 or any part thereof) is implemented using hardware, software or a combination thereof and is implemented in one or more computer systems or other processing systems. An example of a computer system 1000 is shown in FIG. 10. The computer system 1000 represents any single or multi-processor computer. In conjunction, single-threaded and multi-threaded applications are used. Unified or distributed memory systems are used.

In one example, the present invention is implemented in a multi-platform (platform independent) programming language such as Java, programming language/structured query language (PL/SQL), hyper-text mark-up language (HTML), practical extraction report language (PERL), Flash programming language, common gateway interface/structured query language (CGI/SQL) or the like. Java-enabled and JavaScript-enabled browsers are used, such as, Netscape, HotJava, and Microsoft Explorer browsers. Active content web pages can be used. Such active content web pages include Java applets or ActiveX controls, or any other active content technology developed now or in the future. The present invention, however, is not intended to be limited to Java, JavaScript, or their enabled browsers, and are implemented in any programming language and browser, developed now or in the future, as would be apparent to a person skilled in the relevant art(s) given this description.

In another example, the present invention is implemented using a high-level programming language (e.g., C++) and applications written for the Microsoft Windows NT or SUN OS environments. It will be apparent to persons skilled in the relevant art(s) how to implement the invention in alternative embodiments from the teachings herein.

Computer system 1000 includes one or more processors, such as processor 1004. One or more processors 1004 execute software implementing the routines of the invention, described above. Each processor 1004 is connected to a communication infrastructure 1002 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 1000 includes a display interface 1008 that forwards graphics, text, and other data from the communication infrastructure 1002 (or from a frame buffer not shown) for display on the display unit 1010.

Computer system 1000 also includes a main memory 1006, preferably random access memory (RAM), and also includes a secondary memory 1012. The secondary memory 1012 includes, for example, a hard disk drive 1014 and/or a removable storage drive 1016, representing a floppy disk drive, a magnetic tape drive, an optical disk drive, etc. The removable storage drive 1016 reads from and/or writes to a removable storage unit 1018 in a well known manner. Removable storage unit 1018 represents a floppy disk, magnetic tape, optical disk, etc., which is read by and written to by removable storage drive 1016. As will be appreciated, the removable storage unit 1018 includes a computer usable storage medium having stored therein computer software and/or data.

In alternative embodiments, secondary memory 1012 includes other similar means for allowing computer programs or other instructions to be loaded into computer system 1000. Such means include, for example, a removable storage unit 1022 and an interface 1020. Examples include a program cartridge and cartridge interface (such as that found in video game console devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 also includes a communications interface 1024. Communications interface 1024 allows software and data to be transferred between computer system 1000 and external devices via communications path 1026. Examples of communications interface 1024 include a modem, a network interface (such as Ethernet card), a communications port, interfaces described above, etc. Software and data transferred via communications interface 1024 are in the form of signals which are electronic, electromagnetic, optical or other signals capable of being received by communications interface 1024, via communications path 1026. Note that communications interface 1024 provides a means by which computer system 1000 interfaces to a network such as the Internet.

The present invention is implemented using software running (that is, executing) in an environment similar to that described above. In this document, the term "computer program product" is used to generally refer to removable storage unit 1018, a hard disk installed in hard disk drive 1014, or a carrier wave carrying software over a communication path 1026 (wireless link or cable) to communication interface 1024. A computer useable medium includes magnetic media, optical media, or other recordable media, or media that transmits a carrier wave or other signal. These computer program products are means for providing software to computer system 1000.

Computer programs (also called computer control logic) are stored in main memory 1006 and/or secondary memory 1012. Computer programs are also received via communications interface 1024. Such computer programs, when executed, enable the computer system 1000 to perform the features of the present invention as discussed herein. In particular, the computer programs, when executed, enable the processor 1004 to perform features of the present invention. Accordingly, such computer programs represent controllers of the computer system 1000.

The present invention is implemented as control logic in software, firmware, hardware or any combination thereof. In an embodiment where the invention is implemented using software, the software is stored in a computer program product and loaded into computer system 1000 using removable storage drive 1006, hard disk drive 1014, or interface 1020. Alternatively, the computer program product is downloaded to computer system 1000 over communications path 1026. The control logic (software), when executed by the one or more processors 1004, causes the processor(s) 1004 to perform functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s) from the teachings herein.

CONCLUSION

While various embodiments of the present invention have been described above, it should be understood that they have been presented by way of example, and not limitation. It will be apparent to persons skilled in the relevant art(s) that various changes in form and detail are made therein without departing from the spirit and scope of the invention. Thus the present invention should not be limited by any of the above-described exemplary embodiments, but should be defined only in accordance with the following claims and their equivalents.

What is claimed is:

1. A system for transmitting messages from a client messaging application to an autonomous computer program that acts as an agent for another program, the system comprising:

a first interface mutually registered with at least one of a plurality of client messaging applications, the interface for performing the steps of:
receiving a message from the at least one of the plurality of client messaging applications, wherein the message includes a request to query at least one informational database for returning an information set back to client messaging application; and
translating a calling convention of the message to a calling convention of a base code;

a computer communicatively coupled to the first interface, the computer for performing the steps of:
determining, based on the request, a destination of the message, wherein the destination is an autonomous computer program that acts as an agent for a client-user for accessing the at least one informational database; and
selecting the autonomous computer program determined to be the destination of the message for accessing the informational database to retrieve the informational set; and a second interface coupled to the computer, the second interface for performing the steps of:
translating, in response to the selecting, the message in the calling convention of the base code to a calling convention of the autonomous computer program determined to be the destination of the message;
transmitting, in response to the translating, the message to the autonomous computer program which has been determined to be the destination of the message without further user intervention;
receiving information from the autonomous computer program in a return message; and translating a calling convention of the return message to the calling convention of the base code;
at the computer, further performing the step of:
determining the destination of the return message, wherein the destination is a client messaging application; and
at the first interface, further performing the steps of:
selecting the client messaging application determined to be the destination of the message;
translating the calling convention of the message in the base code to the calling convention of the selected client messaging application determined to be the destination of the message; and
transmitting the message to the client messaging application determined to be the destination of the message.

2. The system of claim 1, wherein the first interface comprises:
An Application Programming Interface for interfacing with a plurality of mutually registered client messaging applications and for registering with at least one of the plurality of client messaging applications.

3. The system of claim 1, wherein the second interface comprises:
an Application Programming Interface for translating the request for information to the autonomous computer program and for translating the return message to the computer.

4. The system of claim 1, wherein the client messaging application comprises an instant messaging application for sending and receiving instant messages.

5. The system of claim 4, wherein the instant messaging application comprises any one of:
Lotus Sametime Messaging;
America Online Instant Messenger;
MSN Messenger Service;
Yahoo Messenger;
ICQ;
Jabber Instant Messaging; and
a Telnet utility.

6. The system of claim 1, wherein the autonomous computer program comprises a messaging server.

7. The system of claim 6, wherein the messaging server comprises any one of:
an IBM MQSeries server;
a Microsoft Transaction server;
a Lotus Domino server; and
an LDAP utility.

8. The system of claim 1, wherein the autonomous computer program retrieves the requested information from any one of:
a personal finance database;
a stock market database;
a personal contact database;
a web site;
an FTP site; and
a gopher site.

9. A system for transmitting messages from a client messaging application to a plurality of autonomous computer programs that act as agents for other programs, the system comprising:
a first interface connected to and mutually registered with a client messaging application, the client messaging application for performing the steps of:
receiving a message from the client messaging application via the interface, wherein the message includes a request to query at least one informational database for returning an information set back to client messaging application; and
translating a calling convention of the message to a calling convention of a base code;
a computer communicatively coupled to the first interface, the computer for performing the steps of:
determining, based on the request, a destination of the message, wherein the destination is one of a plurality of autonomous computer programs that act as agents for a client-user for accessing the at least one informational database; and
selecting the autonomous computer program from the plurality of autonomous computer programs determined to be the destination of the message for accessing the informational database to retrieve the informational set; and
a second interface connected to the computer, the second interface for performing the steps of:
translating, in response to the selecting, the message in the calling convention of the base code to a calling convention of the autonomous computer program;
transmitting, in response to the translating, the message to the autonomous computer program which has been determined to be the destination of the message;
receiving information from the autonomous computer program in a return message; and
translating a calling convention of the return message to the calling convention of the base code;
at the computer, further performing the step of:
determining the destination of the return message, wherein the destination is the client messaging application; and
at the first interface, further performing the steps of:
selecting the client messaging application determined to be the destination of the message;
translating the message in the calling convention of the base code to the calling convention of the selected client messaging application determined to be the destination of the message; and
transmitting the message to the client messaging application determined to be the destination of the message.

10. The system of claim 9, wherein the first interface comprises:
an Application Programming Interface for interfacing with the client messaging application and for registering with the plurality of client messaging application.

11. The system of claim 9, wherein the second interface comprises:
an Application Programming Interface for translating the request for information to the autonomous computer program determined to be the destination of the message and for translating the return message to the computer.

12. The system of claim 9, wherein the client messaging application comprises an instant messaging application for sending and receiving instant messages.

13. The system of claim 12, wherein the instant messaging application comprises any one of:
Lotus Sametime Messaging;
America Online Instant Messenger;
MSN Messenger Service;
Yahoo Messenger;
ICQ;
Jabber Instant Messaging; and
a Telnet utility.

14. The system of claim 9, wherein each of the plurality of autonomous computer programs comprise a messaging server.

15. The system of claim 14, wherein the messaging server comprises any one of:
an IBM MQSeries server;
a Microsoft Transaction server;
a Lotus Domino server; and
an LDAP utility.

16. The system of claim 9, wherein each of the plurality of autonomous computer programs retrieve the requested information from any one of:
a personal finance database;
a stock market database;
a personal contact database;
a web site;
an FTP site; and
a gopher site.

17. A system for transmitting messages from a plurality of client messaging applications to a plurality of autonomous computer programs that act as an agent for other programs, the system comprising:
a first interface mutually registered with at least one of a plurality of client messaging applications, the first interface for performing the steps of:
receiving a message from the at least one of the plurality of client messaging applications, wherein the message includes a request to query at least one informational database for returning an information set back to client messaging application; and
translating a calling convention of the message to a calling convention of a base code;
a computer communicatively coupled to the first interface, the computer for performing the steps of:
determining, based on the request, a destination of the message, wherein the destination is one of a plurality of autonomous computer programs that act as an agent for a client-user for accessing the at least one informational database; and
selecting one of a plurality of autonomous computer programs determined to be the destination of the message for accessing the informational database to retrieve the informational set; and
a second interface coupled to the computer, the second interface for performing the steps of:
translating, in response to the selecting, the message in the calling convention of the base code to a calling convention of the autonomous computer program determined to be the destination of the message;
transmitting, in response to the translating, the message to the autonomous computer program which has been determined to be the destination of the message without user intervention;
receiving information from the autonomous computer program in a return message; and
translating a calling convention of the return message to the calling convention of the base code;
at the computer, further performing the steps of:
determining the destination of the return message, wherein the destination is one of a plurality of client messaging applications; and
selecting the client messaging application determined to be the destination of the message; and
at the first interface, further performing the steps of:
translating the message in the calling convention of the base code to the calling convention of the selected client messaging application determined to be the destination of the message; and
transmitting the message to the client messaging application determined to be the destination of the message.

18. The system of claim 17, wherein the first interface comprises:
an Application Programming Interface for interfacing with a plurality of mutually registered client messaging applications and for registering with at least one of the plurality of client messaging applications.

19. The system of claim 17, wherein the second interface comprises:
an Application Programming Interface for translating the request for information to the autonomous computer program determined to be the destination of the message and for translating the return message to the computer.

20. The system of claim 17, wherein each of the plurality of client messaging applications comprise an instant messaging application for sending and receiving instant messages.

21. The system of claim 20, wherein the instant messaging application comprises any one of:
Lotus Sametime Messaging;
America Online Instant Messenger;
MSN Messenger Service;
Yahoo Messenger;
ICQ;
Jabber Instant Messaging; and
a Telnet utility.

22. The system of claim 17, wherein each of the plurality of autonomous computer programs comprise a messaging server.

23. The system of claim 22, wherein the messaging server comprises any one of:
an IBM MQSeries server;
a Microsoft Transaction server;
a Lotus Domino server; and
an LDAP utility.

24. The system of claim 17, wherein each of the plurality of autonomous computer programs retrieve the requested information from any one of:
a personal finance database;
a stock market database;
a personal contact database;
a web site;
an FTP site; and
a gopher site.

25. A method for transmitting messages from a client messaging application to an autonomous computer program that acts as an agent for another program, the method comprising the steps of:
receiving a message from one of a plurality of client messaging applications, wherein the message includes a request to query at least one informational database for returning an information set back to client messaging application;
translating a calling convention of the message to a calling convention of a base code;
determining, based on the request a destination of the message, wherein the destination is an autonomous computer program that acts as an agent for a client-user for accessing the at least one informational database;
selecting the autonomous computer program determined to be the destination of the message for accessing the informational database to retrieve the informational set;

translating, in response to the selecting, the message in the calling convention of the base code to a calling convention of the autonomous computer program determined to be the destination of the message;

transmitting, in response to the translating, the message to the autonomous computer program which has been determined to be the destination of the message without user intervention;

receiving information from the autonomous computer program in a return message;

translating a calling convention of the return message to the calling convention of the base code;

determining the destination of the return message, wherein the destination is one of a plurality of client messaging applications;

selecting the client messaging application determined to be the destination of the message;

translating the message in the calling convention of the base code to the calling convention of the selected client messaging application determined to be the destination of the message; and transmitting the message to the client messaging application determined to be the destination of the message.

26. The method of claim 25, wherein the first receiving step comprises:

receiving, via an Application Programming Interface, a message from one of a plurality of client messaging applications, wherein the Application Programming Interface interfaces with the plurality of mutually registered client messaging applications and registers with at least one of the plurality of client messaging applications.

27. The method of claim 25, wherein the translation is performed by an Application Programming Interface.

28. The method of claim 27, further comprising a step before the second transmitting step of:

translating, by the Application Programming Interface, the return message to the client messaging application.

29. The method of claim 25, wherein each of the plurality of client messaging applications comprise an instant messaging application for sending and receiving instant messages.

30. The method of claim 29, wherein the instant messaging application comprises any one of:

Lotus Sametime Messaging;
America Online Instant Messenger;
MSN Messenger Service;
Yahoo Messenger;
ICQ;
Jabber Instant Messaging; and
a Telnet utility.

31. The method of claim 25, wherein the autonomous computer program comprises a messaging server.

32. The method of claim 31, wherein the messaging server comprises any one of:

an IBM MQSeries server;
a Microsoft Transaction server;
a Lotus Domino server; and
an LDAP utility.

33. The method of claim 25, wherein the autonomous computer program retrieves the requested information from any one of:

a personal finance database;
a stock market database;
a personal contact database;
a web site;
an FTP site; and
a gopher site.

34. A computer readable storage medium embedded computer instructions for transmitting messages from a plurality of client messaging applications to an autonomous computer program that acts as an agent for another program, the computer instructions comprising instructions for:

receiving a message from one of a plurality of client messaging applications, wherein the message includes a request to query at least one informational database for returning an information set back to client messaging application;

translating a calling convention of the message to a calling convention of a base code;

determining, based on the request, a destination of the message, wherein the destination is a an autonomous computer program that acts as an agent for a client-user for accessing the at least one informational database;

selecting the autonomous computer program determined to be the destination of the message for accessing the informational database to retrieve the informational set;

translating, in response to the selecting, the message in the calling convention of the base code to a calling convention of the autonomous computer program determined to be the destination of the message;

transmitting, in response to the translating, the message to the autonomous computer program which has been determined to be the destination of the message without user intervention receiving information from the autonomous computer program in a return message;

translating a calling convention of the return message to the calling convention of the base code;

determining a destination of the return message, wherein the destination is one of the plurality of client messaging applications;

selecting the client messaging application determined to be the destination of the message; and transmitting the message to the client messaging application determined to be the destination of the message.

35. The computer readable medium of claim 34, further comprising the instruction of:

translating the base code calling convention of the return message to the calling convention of the client messaging application determined to be the destination of the message.

36. The computer readable medium of claim 34, wherein the first receiving step comprises:

receiving, via an Application Programming Interface, a message from one of a plurality of client messaging applications, wherein the Application Programming Interface interfaces with the plurality of mutually registered client messaging applications and registers with at least one of the plurality of client messaging applications.

37. The computer readable medium of claim 34, wherein the translation is performed by an Application Programming Interface.

38. The computer readable medium of claim 37, further comprising a step before the second transmitting step of:

translating, by the Application Programming Interface, the base code calling convention of the return message to the calling convention of the client messaging application determined to be the destination of the message.

39. The computer readable medium of claim 34, wherein the client messaging application comprises an instant messaging application for sending and receiving instant messages.

40. The computer readable medium of claim 39, wherein the instant messaging application comprises any one of:
   Lotus Sametime Messaging;
   America Online Instant Messenger;
   MSN Messenger Service;
   Yahoo Messenger;
   ICQ;
   Jabber Instant Messaging; and
   a Telnet utility.

41. The computer readable medium of claim 34, wherein the autonomous computer program comprises a messaging server.

42. The computer readable medium of claim 41, wherein the messaging server comprises any one of:
   an IBM MQSeries server;
   a Microsoft Transaction server;
   a Lotus Domino server; and
   an LDAP utility.

43. The computer readable medium of claim 34, wherein the autonomous computer program retrieves the requested information from any one of:
   a personal finance database;
   a stock market database;
   a personal contact database;
   a web site;
   an FTP site; and
   a gopher site.

44. A method for providing access to an autonomous computer program that acts as an agent for another program via an instant messaging application, comprising the steps of:

receiving from at least one instant messaging application an instant message including a request to query at least one informational database for returning an information set back to client messaging application;

translating a calling convention of the instant message to a calling convention of a base code;

determining, based on the request, a destination of the instant message, wherein the destination is an autonomous computer program that acts as an agent for a client-user for accessing the at least one informational database;

selecting the autonomous computer program determined to be the destination of the message for accessing the informational database to retrieve the informational set;

translating, in response to the selecting, the base code calling convention of the request for information in the instant message into a calling convention compatible with the autonomous computer program determined to be the destination of the instant message;

transmitting, in response to the translating, the translated request for information to the autonomous computer program, wherein the autonomous computer program processes the translated request for information, without user intervention;

receiving information from the autonomous computer program;

generating an instant message including the received information; and sending the generated instant message to the instant messaging application.

* * * * *